United States Patent [19]

Dickey

[11] 4,059,064
[45] Nov. 22, 1977

[54] MARINE AUTO PILOT

[75] Inventor: Baron Christian Dickey, Palo Alto, Calif.

[73] Assignee: Alpha Marine Systems, Inc., Sunnyvale, Calif.

[21] Appl. No.: 673,798

[22] Filed: Apr. 5, 1976

[51] Int. Cl.² .......................................... B63H 25/02
[52] U.S. Cl. .............................. 114/144 E; 33/363 R; 318/588; 318/647
[58] Field of Search ........... 73/178 R; 33/349, 363 R; 180/74.1, 74.2; 114/144 R, 144 A, 144 E; 235/150.2, 150.26; 244/50, 175, 179; 307/309, 278; 324/45; 318/588, 647, 653

[56] References Cited

U.S. PATENT DOCUMENTS

| | | | |
|---|---|---|---|
| 3,237,583 | 3/1966 | Johnson | 114/144 E |
| 3,741,474 | 6/1973 | Kawada et al. | 114/144 E X |
| 3,946,691 | 3/1976 | Freeman | 114/144 E |

FOREIGN PATENT DOCUMENTS

| | | | |
|---|---|---|---|
| 478,057 | 10/1951 | Canada | 33/363 R |
| 1,175,606 | 12/1969 | United Kingdom | 33/363 R |

*Primary Examiner*—Stephen G. Kunin
*Attorney, Agent, or Firm*—William E. Green

[57] ABSTRACT

A marine auto pilot employing a compass with a Hall-effect sensing element in conjunction with a magnetic circuit designed to provide a high intensity magnetic field; electrical circuitry designed to produce high servo-loop gain at frequencies lower than the normal sea wave frequencies, and lower gain at the normal sea wave frequencies; a D.C. Linear Motor drive system in conjunction with a rudder position feedback signal; and a linear ball-screw and nut gearing system for converting the high-speed output of the direct current drive motor to a low-speed high-torque drive at the rudder, having the nut and ball-screw connected through rolling contact balls.

10 Claims, 4 Drawing Figures

MARINE AUTO PILOT

BACKGROUND OF THE INVENTION

1. Field of the Invention

This invention relates to auto pilots for marine vessels and more particularly relates to a steering system for sail boats using a compass designed to respond to the horizontal component of the earth's field, a highly efficient linear motor drive unit, and a control unit adaptable to either wind or compass input with circuitry designed to provide a combination of low system gain and continuous response to a rudder position feedback unit.

2. Description of the Prior Art

Devices for detecting the extent of deviation from a predetermined course and then correcting the direction to accomplish a return to the predetermined course are well known as auto pilots.

Auto pilots generally have the following common elements:

a. a sensing unit for determining the heading of the vessel and providing a direction input signal to a control unit. Among the known sensing units are compass cards having electrical contacts, or inductors, or capacitors, or permanent magnets, or photo-electric cells positioned relative to said cards and responsive to the earths field in combination with a course dial for setting a predetermined course. The disadvantages inherent in compass card devices have focused attention upon the use of so-called Hall-effect crystals as sensing devices, in the manner as described in U.S. Pat. Nos. 3,906,641 and 3,657,629.

b. a control unit responsive to the direction indicated by the sensing unit signal and designed to determine the extent of course correction necessary to maintain a predetermined course, and to provide a course correction signal to a drive unit. Known control units include mechanical devices directly linking wind vanes to rudders, electrical circuits controlled by pre-set compass sensors, in some cases including wind direction or velocity inputs and combinations thereof as described in U.S. Pat. Nos. 3,857,353 and 3,685,478.

c. a drive unit responsive to the course correction signal and designed to adjust the position of the rudder in accordance with the course correction signal received from the control unit. Commonly used prior art drive units have employed multi-stage spur gearing, planetary transmission systems and even worm gearing. In addition, these systems are usually coupled with an on-off signal from the control unit which produces a non-linear response.

Notwithstanding the recognition in the prior art of the basic parameters necessary to provide an effective and efficient auto pilot for marine vessels generally and sailing vessels in particular, the need for an auto pilot combining the factors of low cost, accuracy, reliability and minimal electrical power, while at the same time maintaining the power and speed of response necessary to control the helm of a small vessel under transoceanic sea conditions, has not been fulfilled by prior art devices.

Although numerous patents have been issued covering individual advances in the related technology, the attempts to integrate the art into systems acceptable to sailors have been largely unsuccessful. The major reasons for the lack of success have been high power consumption, poor course stability, and many unnecessary helm corrections, caused by poor servo response.

More specifically, prior art systems have suffered in whole or in part from the following problems which are solved by this invention.

Recent prior art has indicated the advantages of using a Hall-effect element as the sensor within a compass unit, however, this art employs the Hall-effect element in the proximity of a conventional compass card and continues to have the disadvantage of low signal power output and poor stability.

Another problem of prior art devices is the inability to resolve the inherent conflict in the desire to provide quick response while at the same time avoiding extraneous helm response and unnecessary response to the continuous, but insignificant wind and wave shifts, as opposed to meaningful course deviations.

Proper trim in a sailing vessel is a dynamic factor dependent upon sea and wind conditions. Some prior art devices have attempted to cope with trim control by providing a manual trim correction. However, this cure is a static correction applicable only to a given set of conditions and thus not useful for the dynamic conditions inherent at sea, which will only correct properly for one trim condition. Another approach employs an electrical system having high loop gain. However, the high loop gain has the attendant disadvantages of increased power consumption caused by response to minute changes in wave and wind conditions.

Prior art devices generally employ switching systems to control whether the drive motor runs or stops and its direction. Such systems produce a loop response which is non-linear and produces helm overshoot and poor stability. These are poor response characteristics and are undesirable. Among the schemes utilized to reduce these effects are the inclusion of a dead zone or null position in which the auto pilot is inactive. Such compensation produces a lag in the response of the system so that when it is again activated it must make a large correction and results in overshooting. The resultant corrections combine to cause poor course accuracy and high power consumption.

Another approach to this problem has been the use of a lead network which attempts to damp the oscillatory nature of an on-off drive system. The inclusion of a lead network implies that the gain at the perturbing frequency will be higher than at low frequencies and thus conditions the drive system to produce even higher power consumption.

The mechanisms commonly employed to translate the control unit's directions into rudder changes are generally inefficient at the gear ratios required in auto pilot systems. This inefficiency is not critical in a power boat, but in a sail boat, where weight is critical and available power is severely limited, an inefficient drive system is such a prohibitive limitation that it renders any such auto pilot unusable. For this reason, although there are many theoretically workable auto pilots for sail boats, in practice the use of auto pilots for sail boats is not generally accepted.

It is the primary object of this invention to provide a low cost, accurate, and reliable marine auto pilot that requires minimal electrical power yet is capable of maintaining sufficient power and speed of response for use by small vessels in transoceanic sailing.

It is a further object of this invention to provide a marine auto pilot that minimizes the number and extent of helm corrections. It is another object of this invention to use a magnetic flux sensitive device, such as a Hall-effect device as an element of a compass designed to respond to the horizontal component of the earth's magnetic field, and at the same time provide an output signal substantially stronger than present art devices.

It is yet another object of this invention to use a Hall-effect device or similar device without using a conventional compass card device.

A still further object of this invention is to provide continuous automatic trim correction without high power consumption and without the necessity for a dead band or null position within the control system.

Another object of this invention is the provision of a linear motor drive system.

A further object of this invention is the provision of a linear motor drive system in conjunction with a rudder position feedback signal to promote motor speed directly proportional to the rudder correction needed, and thus be adaptable to any vessel and to changing sea and wind conditions.

Another object of this invention is to provide high servo loop gain at frequencies lower than the normal sea perturbing frequency and lower gain at the perturbing frequency for the purpose of producing long term course accuracy while minimizing extraneous helm motion, which would be produced by a linear frequency response.

The objects of this invention are achieved in the following manner.

The sensing unit, in the preferred embodiment includes a Hall-effect element. Any signal source magnetic field sensing device, capable of providing information as to the magnitude and direction of magnetic fields and particularly those capable of providing a response which varies as the sine of the angle between a magnetic field and its axis may be employed as sensing elements. As set forth above, the use of Hall-effect elements in marine auto pilot devices is not novel per se.

The other primary components of the sensing unit are the magnets. Again the use of magnets to create a magnetic field within the sensing unit is well known, as is the creation of a magnetic field and disposing a Hall-effect device therein.

However, in the subject invention two magnets are used and are positioned with their opposite poles facing each other. This spaced relationship causes the creation of a high intensity magnetic field between the poles, which is additive and which is homogeneous. A typical prior art device creates magnetic fields in the range of 25 - 50 oersteds. In the sensing unit of this invention, a field generally not less than 500 oersteds is obtained and in the preferred embodiment a field strength in excess of 2,000 oersteds is used. These field strengths may be increased or decreased, as will be apparent to those skilled in the art, to meet the requirements of a particular operation.

The Hall-effect element is then located substantially centrally within the high intensity magnetic field. Although prior art devices disclose a Hall-effect element within a magnetic field, those devices generally employ one magnet or employ more than one magnet, but not having their poles situated so as to provide an additive and homogeneous field, and they do not deploy their Hall-effect elements substantially central to the field created. Typically, the Hall-effect element is positioned on the same vertical axis as a magnet, but is located either above or below the magnet. In such a device the magnetic field is created by the interaction between the opposite poles of the same magnet. Due to magnetic properties, such as self demagnetization, well understood by those skilled in the art, those magnets are generally relatively long compared to the diameter of the magnet. In the subject invention, the outside and opposite poles of the magnet employed are used to align the magnet assembly with the external magnetic field, but are not used to create the magnetic field in which the Hall-effect element is located. Thus two fields are created, one an interior field with respect to the opposite poles of the magnets which are facing each other and another exterior field with respect to the opposite poles of the magnets which are not facing each other. A consequence is the ability of the invention to use magnets of a short length relative to their diameter and relative to the space between the magnets themselves. In the preferred embodiment the ratio of the length of the magnet to its diameter is 1:3 and the ratio of the magnet diameter to the space between them is 1:1.

The magnets employed in the subject invention are preferably fabricated from high coercivity materials such as rare earth metals, including, but not limited to samarium cobalt and mish metal.

Magnet materials which have the combined qualities of high coercivity and high remanence provide optimum magnet configurations. The high coercivity permits the use of shorter magnets without demagnetization, the high remanence promotes the maintenance of a high density magnetic field.

Another characteristic of the subject sensing unit is that it is effectively self damping and does not require mounting in an external gimbal unit as is commonly required of prior art devices. This characteristic is again related to the location, size and symmetry of the sensing unit elements and is an unobvious and unexpected benefit of the invention which permits the sensing unit to accept a wide latitude of vessel attitudes without the necessity for external gimbals.

Although we have shown the sensor unit described herein as a compass, it may also be used as a sensor of rudder angle or as a wind detector indicator. In addition, two Hall-effect element devices positioned within a magnetic field in accordance with this invention may be used to derive cosine functions as well as sine functions.

The control unit of the subject invention, including the electrical circuit is unique in the obtaining of a linear drive system having a non-linear frequency response component. In particular, the use of two signal paths, one with linear frequency response at low gain and the other providing a tailored frequency response at frequencies lower than the sea perturbing frequencies is critical. As previously discussed herein, prior art devices, even when corrective measures such as lead circuits are used, still create an on-off, or bang-bang non-linear drive system. The present invention is not only structurally different from prior art device, but provides a qualitative difference that is difficult to described, but is readily apparent to the operator. A system that maintains a vessel substantially on course at all times without hunting and without continual meandering above and below the intended heading is unknown.

The use of a cut-off frequency to minimize extraneous helm responses to sea perturbances is a vital element of the control unit of the invention. In a typical sea these perturbances might be found in a range of 0.1 to 5 Hertz.

SUMMARY OF THE INVENTION

Stated briefly, in a preferred embodiment of the invention a Hall-effect element direction sensing device is positioned substantially centrally in a homogeneous, high intensity magnetic field formed by magnets having their opposite poles facing each other, but spaced apart, to provide a relatively large signal, said signal is processed through two signal paths, one having a cut-off frequency below the normal sea perturbing frequencies, then said frequency compensated signal is summed with the uncompensated signal and the summed signal is used as a direction and polarity indicating signal for changing vessel direction using a direct current linear driven motor and a high efficiency ball-nut and screw gear assembly. A rudder position sensor may also be summed with the frequency compensated and uncompensated signals.

BRIEF DESCRIPTION OF THE DRAWINGS

A complete understanding of the invention may be obtained from the following description and explanation which refer to the accompanying drawings illustrating the invention.

DESCRIPTION OF THE PREFERRED EMBODIMENT

Figure 1:
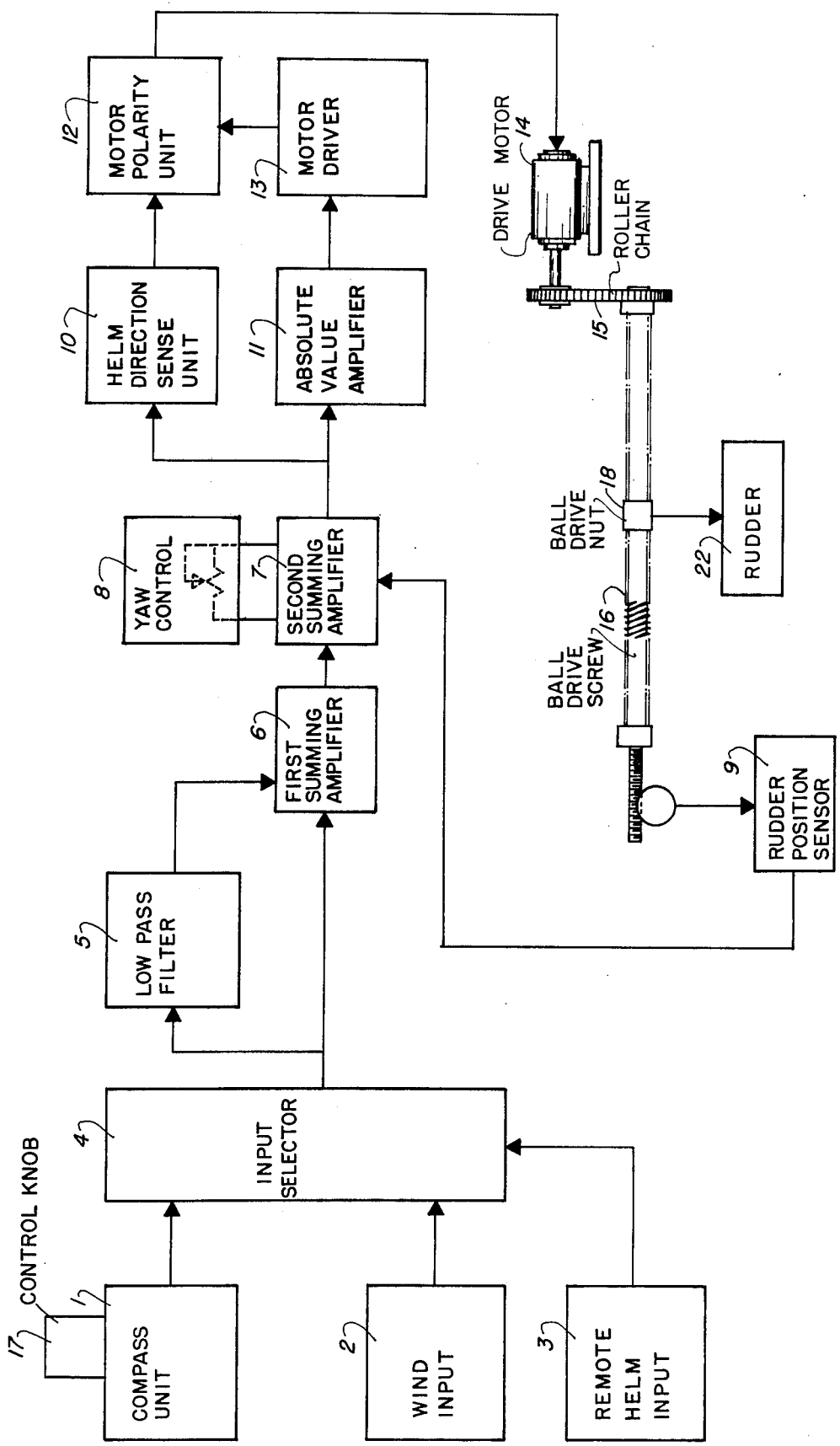
FIG. 1 is a block diagram of a complete auto pilot system in accordance with the invention.

Referring now to FIG. 1 input selector 4 is switchably connected to compass unit 1, wind input 2 and remote helm input 3. The operator selects the desired input and the output of input selector 4 provides inputs' to two signal paths. One path carries the signal through a low-pass filter 5 having a cut-off frequency below the normal sea perturbing frequencies and then to first summing amplifier 6. The other path carries the signal directly to first summing amplifier 6 without frequency compensation. First summing amplifier 6 sums the two signals and its output, the processed error signal is fed to the input of second summing amplifier 7. Second summing amplifier 7 then sums the processed error signal from 6 with a negative rudder feedback signal from rudder position sensor 9. Second summing amplifier 7 also incorporates a yaw control 8 for manual selection of loop gain.

The output signal of second summing amplifier 7 is proportional to the difference between the position of the rudder at that moment and the desired position of the rudder and corresponds to the correction required of motor driver 13. The output signal of the second summing amplifier drives two elements, the helm direction sense unit 10 and the absolute value amplifier 11. Helm direction sense unit 10 determines the Helm error direction and through motor polarity unit 12 connects drive motor 14 to motor driver 13. Absolute value amplifier 11 determines the magnitude of the error signal without regard to its polarity and provides a signal to motor driver 13, proportional to the rudder position error.

This motor driving system has the advantage of being able to use a common relay as the polarity changing device so that little power is lost in driving the motor and the prior art problem of contact burning is eliminated since contacts are never opened or closed while motor current is flowing. An additional advantage is derived as motor driver 13 may now consist of a single ended transistor driver since it responds solely to the absolute value of the error signal so that only one transistor voltage drop appears in the drive circuit thus increasing electrical efficiency.

Drive motor 14 though ball drive screw 16 and ball drive nut 18 is operatively connected to rudder 20 and through positional changes in rudder 22 course changes are effected.

Figure 2:
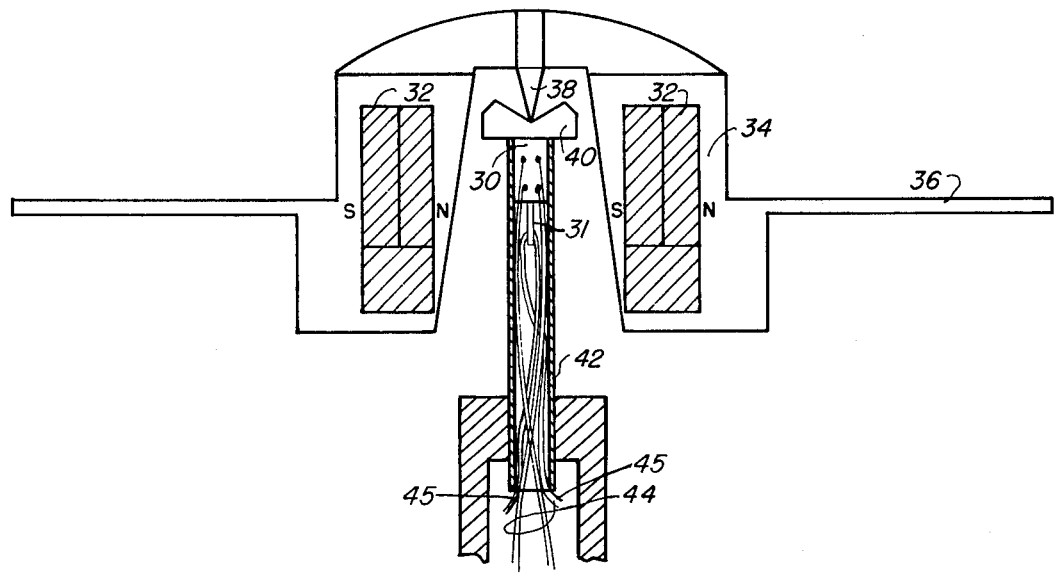
FIG. 2 is a section view of the compass unit.

Referring now to FIG. 2, an embodiment of compass unit 1 is shown in detail. This unit comprises Hall-effect element 30 mounted between direction sensing magnets 32 which are held in place by hub assembly 34, which also carries damping ring 36 and is free to rotate about pivot pin 38, which is fabricated from a wear resistant material. Pivot pin 38 rests in pivot cup 40. The Hall-effect element 30 and pivot cup 40 are supported by support means 42. Support means 42 is designed to allow the leads 44 of the Hall-effect element 30 to exit from the assembly as shown.

The magnet and hub assembly may be mounted in a conventional manner within a sphere suspended in a damping fluid such as silicone, external gimbals are not required.

The magnet assembly in this configuration provides a homogeneous magnetic field of very high intensity in the space occupied by Hall-effect element 30. A high intensity field is desirable since the signal from a Hall-effect element is proportional to the control current through the element times the magnetic field through the element, mutually orthagonal to the axis of the control current and the voltage or output axis. A second Hall-effect element 31 having leads 45, may optionally be mounted adjacent to or below Hall-effect element 30 in a manner well known to those skilled in the arts to provide the cosine function derived from Hall-effect element 31. The Hall-effect element 31 may be included as a design feature and employed or not employed at the discretion of the operator without affecting the operation of Hall-effect element 30.

Sensing magnets 32 are mounted within hub assembly 34 so that their respective north and south poles face each other, thus a high intensity magnetic field of a homogeneous nature between the pole faces will be produced if the magnetic material has a high remanence. If the magnetic material is also characterized by high coercivity the magnets may be short in length as shown in FIG. 2. It will be obvious to those skilled in the art that the single magnets shown may be divided into a larger number of magnets performing the same function.

Because hub assembly 34 is free to rotate within pivot cup 40, the direction sensing magnets 32 act as a unit aligning themselves with external fields, such as the earths magnetic field. A course selecting means, which is conventionally a control knob or dial integral within the case within which the compass structure is located, is provided which rotates support means 42 with respect to the vessel. The output of Hall-effect element 30 thus varies as the sine of the angle of deviation from the selected heading. The signal produced thereby is then amplified in an operational type amplifier as described in FIG. 3.

Figure 3:
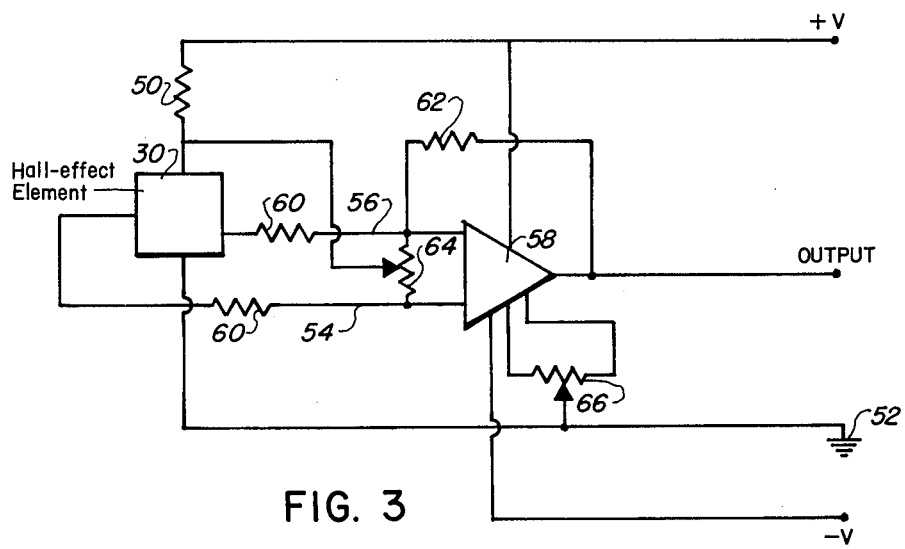
FIG. 3 is a schematic diagram of an amplifier circuit useful in the subject invention.

Referring to FIG. 3, the circuit functions as follows: Positive voltage +V in conjunction with resistor 50 defines the control current through Hall-effect element 30 to ground 52. The sense or voltage output connections, 54 and 56 from Hall-effect element 30 are respectively connected to the non-inverting and inverting elements of operational amplifier 58, the gain of which is defined by the ratio of the source resistance of Hall-effect element 30 derived from source resistors 60 and resistor 62. Since small geometric offsets in Hall-effect element 30 can introduce a fixed offset voltage at the output, potentiometer 64 is positioned at the output of Hall-effect element 30 to counter any such offset.

Similarly operational amplifier 58 has provisions for internal static offset correction by potentiometer 66 which is connected to the negative supply.

The above described direction sensing system has the additional advantage of being ground referenced. In other words, no error equals ground, thus variations in supply voltage do not produce changes in heading, but instead produce only multiplicative effects when there is an error. Although this is the preferred embodiment, a system utilizing a single voltage supply and offset references is within the scope of the invention.

Figure 4:
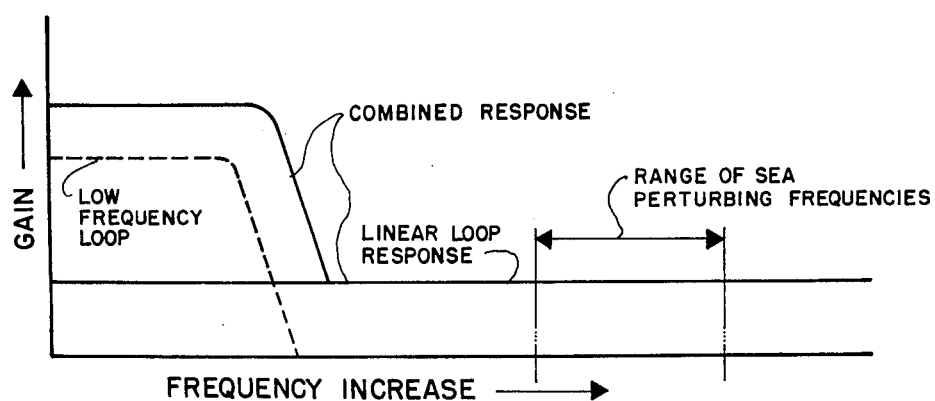
FIG. 4 is a graph illustrating the gain versus frequency response of the signal processing amplifier.

FIG. 4 is a graph illustrating the gain frequency response at the output of first summing amplifier 6 in addition to the individual response of each input loop. Means may be provided to diminish the gains of the low frequency loop to facilitate rapid course changes. As can be seen from FIG. 4, a linear loop response alone cannot be responsive to changes in the sea perturbance. On the otherhand, our system which provides for high gain at frequencies lower than the normal sea perturbance frequencies and low gain at the perturbant frequencies, produces long term course accuracy while at the same time it minimizes extraneous helm motion, a combination which cannot be obtained by a linear frequency response system.

While the embodiments described and illustrated may be modified in various ways readily apparent to those skilled in the art, the invention is intended to include those within the spirit and scope of the following claims.

What is claimed is:

1. Apparatus for producing a voltage correlated in magnitude and polarity to the relative rotative position between a first member and a second member rotatable relative to said first member on a rotational axis, comprising:
   a. A Hall-effect element fixed to said first member and positioned on said rotational axis.
   b. First and second permanent magnets producing individual magnetic fields and fixed to said second member symmetrical to said rotational axis, said magnets each having north and south poles, the north pole of said first magnet and the south pole of said second magnet being diametrically spaced apart and of large diameter relative to the space between them, to form a high intensity, additive and homogeneous magnetic field there between for the purpose of driving said Hall-effect element and being disposed so that said Hall-effect device is located substantially centrally within said high intensity additive and homogeneous magnetic field, senses and high intensity, additive and homogeneous magnetic field and is substantially non-responsive to the earth's magnetic field, the south pole of said first magnet and the north pole of said second magnet being sufficiently remote from said additive and homogeneous magnetic field to avoid substantial influence upon said Hall-effect element.

2. Apparatus according to claim 1 wherein said north pole of said first magnetic and said south pole of said second magnet reside in a common plane normal to said rotational axis.

3. Apparatus according to claim 2 wherein said south pole of said first magnet and said north pole of said second magnet reside in said common plane.

4. Apparatus according to claim 3 wherein said first and second magnets are bar magnets oriented so that all poles of both magnets reside on a line intersecting said rotational axis.

5. Apparatus according to claim 1 wherein said south pole of said first magnet and said north pole of said second magnet are disposed for cooperation with the earths magnetic field so that said voltage corresponds to the magnetic heading of said first member.

6. Apparatus according to claim 1 wherein said additive and homogeneous magnetic field has a magnetic intensity in excess of 500 oersteds.

7. Apparatus according to claim 1 wherein said magnets are made of material with high coercivity and high remanence so that the magnets may be relatively short in length without self demagnetization.

8. Apparatus according to claim 1 wherein two or more Hall-effect element devices are used to generate a signal proportional to both the sine and cosine functions of the angle between the magnets and the Hall-effect elements.

9. A marine auto pilot system for a vessel, which system is characterized by low power drain and high long-term course accuracy comprising, in combination;
   a. a hub member
   b. means for supporting said hub member for free rotation on a generally vertical rotational axis relative to said vessel,
   c. first and second permanent magnets producing individual magnetic fields and fixed to said hub member symmetrical to said rotational axis, said magnets each having north and south poles, the north pole of said first magnet and the south pole of said second magnet being diametrically spaced apart to form an additive and homogeneous magnetic field therebetween, the south pole of said first magnet and the north pole of said second magnet being sufficiently remote from said additive and homogeneous magnetic field to avoid substantial influence upon said Hall-effect element and to cooperate with the earth's magnetic field so that said hub remains aligned with the earth's magnetic field independent of the heading of said vessel,
   d. a Hall-effect element surrounded by said additive and homogeneous magnetic field and adjustable to a selected heading of said vessel so as to produce a voltage signal having a magnitude and polarity corresponding to the deviation from said heading,
   e. an operational amplifier for amplifying the voltage signal,
   f. a summing amplifier having a first input connected to said voltage signal, a second input and an output proportional to the sum of said first and second inputs,
   g. means for providing a cut-off frequency and having an output connected to said second input and said output characterized by having a relatively high magnitude at frequencies below said cut-off frequency and a relatively low magnitude at frequencies above said dut-off frequency, h. means for connecting said voltage signal to said frequency cut-off means so that said summing amplifier has a higher gain thereabove to afford immunity to relatively high perturbing frequencies, i. a linearly driven direct current motor responsive to the output of said summing amplifier so that said motor is driven at a speed corresponding to the magnitude of the deviation and a direction corresponding to the polarity of said voltage signal, and j. means operatively connected to said motor for altering the course of said vessel to eliminated the deviation.

10. In an auto pilot for a marine vessel sailing in the presence of perturbing frequencies, and producing a signal having a magnitude and polarity correlated to the deviation of the actual heading from the desired headings, a method for processing said signal to minimize the effect of perturbing frequencies comprising the steps of;

a. attenuating relatively high frequency portions of said signal to produce an attenuated signal;

b. summing the signal and the attenuated signal;

c. determining the absolute value of said summed signal;

d. determining the polarity of said summed signal;

e. steering the vessel in a direction dictated by the polarity and at a rate dictated by the absolute value of said signal.

* * * * *